United States Patent [19]
Segman

[11] Patent Number: 6,122,012
[45] Date of Patent: Sep. 19, 2000

[54] METHOD OF SELECTIVE COLOR CONTROL OF DIGITAL VIDEO IMAGES

[75] Inventor: Yosef Segman, Zichron Yaacov, Israel

[73] Assignee: Oplus Technologies Ltd., Haifa, Israel

[21] Appl. No.: 09/261,193

[22] Filed: Mar. 3, 1999

[51] Int. Cl.$^7$ ........................................................ H04N 5/14
[52] U.S. Cl. .......................... 348/576; 348/582; 345/153; 345/199; 358/518; 358/523
[58] Field of Search ..................................... 348/576, 577, 348/582; 345/150, 154, 153, 199, 186; 358/518, 520, 523

[56] References Cited

U.S. PATENT DOCUMENTS

| | | | |
|---|---|---|---|
| 5,254,977 | 10/1993 | Macdonald | 345/150 |
| 5,305,094 | 4/1994 | Belmares-Sarabis et al. | 348/651 |
| 5,504,821 | 4/1996 | Kanamori et al. | 358/518 |
| 5,798,753 | 8/1998 | Zhou et al. | 345/154 |
| 5,801,855 | 9/1998 | Ohta | 358/518 |
| 5,896,136 | 4/1999 | Augustine et al. | 345/150 |

*Primary Examiner*—John K. Peng
*Assistant Examiner*—Trang U. Tran
*Attorney, Agent, or Firm*—Mark M. Friedman

[57] ABSTRACT

A method of selective color control of a digital video image, using a digital technique. The method features using simple Look-Up-Tables (LUTs), whose values are calculated from uniquely defined color control functions, to digitally change the saturation of a single color of the chromatic part of a video image without affecting saturations of the remaining colors of the chromatic part of the same video image. A digital video input image is scanned, row by row, pixel by pixel. Each input image pixel value, defined from the chromatic part of the video input image, is assigned an address to be operated on by values in individual color LUTs. For a desired change in an individual color of that image, a new digital video output image is produced featuring the desired change in the individual color without affecting the remaining colors of that same image. Application of this method to video images precludes the need to convert video components (e.g., YCrCb) into RGB (red, green, blue) components. Selective color control using this method enables viewers of video images to do two things currently not achievable using conventional methods of color control of video images. Firstly, to very accurately set or adjust individual colors of a given video image to the actual colors of the subject of the image, and, secondly, to very accurately modify or alter colors of a given video image to produce desired special effects in that video image. These capabilities of color control of video images are immediately applicable to the television and movie industries, where it is critically important for video images to represent actual colors of an image, and to have the capability of producing special effects to video images.

18 Claims, 1 Drawing Sheet

METHOD OF SELECTIVE COLOR CONTROL OF DIGITAL VIDEO IMAGES

FIELD AND BACKGROUND OF THE INVENTION

The present invention relates to color control of digital video images. In particular, this invention relates to a method of selectively controlling the intensity of a single color of a digital video image without affecting the intensities of other colors of the same image, using a digital technique.

In display of video images, color control of an image is currently performed by increasing or decreasing the saturation and/or the hue components of the chromatic part of the video image. Hereinafter, the term 'saturation' refers to the intensity of a color component within the chromatic part of a video image. Saturation may also be referred to as vividness of hue. Hereinafter, the term 'hue' refers to the angle between two color components within the chromatic part of a video image. Current methods of trying to control an individual color of a video image by increasing or decreasing the saturation and/or the hue components of the chromatic part of the video image result in affecting all of the colors of the same video image. It is desirable to have a method of selective, or independent, control of a single color of a video image without affecting the rest of the colors of the same video image.

A practical example of the need for selective color control is in applications using display systems which display digital video images (e.g. TV). Hereinafter, an individual color represents a linear combination of the base colors, whereby the base colors feature red, green, blue, yellow, cyan, and magenta. In such applications, a user typically desires to adjust or change an individual color of the video image, i.e., a single color component of the chromatic part of the video image, without affecting the rest of the colors of the particular video image. For example, a user may desire to adjust only one color, red, green, blue, yellow, magenta, or cyan, of a video image displayed on a TV screen, by pushing or turning the color intensity and/or color hue control button or dial on the TV system control device. Color control by this procedure affects all the colors of the TV image. And not just the single color desired to be changed by the user.

There is thus a need for, and it would be useful to have, a method of selective color control of digital video images. Moreover, there is a need for such a video image color control method which is efficient and robust for purposes of application to current digital video image display systems.

To date, this inventor is not aware of prior art teachings of a method of selective or independent color control of digital video images.

SUMMARY OF THE INVENTION

The present invention relates to a method of selective color control of a digital video image without affecting all the colors of the same image, using a digital technique.

The present invention features a unique method of using simple Look-Up-Tables (LUTs), whose values are calculated from uniquely defined color control functions, to digitally increase or decrease the saturation of a single color of the chromatic part of a video image (e.g., CrCb, UV, or IQ) without affecting saturations of the remaining colors of the chromatic part of the same video image. A digital video input image is scanned, rows by row, pixel by pixel. Each input image pixel value, defined from the chromatic part of the video input image, is assigned an address to be operated on by values in individual color LUTs. For each desired change in an individual color of that image, a new digital video output image is produced featuring the desired change in the individual color without affecting the remaining colors of that same image. Application of this method to video images precludes the need to convert video components (e.g., YCrCb) into RGB (red, green, blue) components.

This method provides viewers of video images with the benefit of having the ability to selectively control individual colors of a video image. Selective color control using the method of the present invention enables viewers of video images to do two things currently not achievable using conventional methods of color control of video images. Firstly, to very accurately set or adjust individual colors of a given video image to the actual colors of the subject of the image, and, secondly, to very accurately modify or alter colors of a given video image to produce desired special effects in that video image. These capabilities of color control of video images are immediately applicable to the television and movie industries, where it is critically important for video images to represent actual colors of an image, and to have the capability of producing special effects to video images.

The preferred embodiment of the method of selective color control of digital video images of the present invention features the following principle steps: (1) receiving a digital video input image, featuring pixels, (2) characterizing the input image and its target output image, (3) defining sets of individual color Look-Up-Tables (LUTs) for control of individual colors, (4) defining sets of individual color control functions used for calculating values in the corresponding sets of LUTs, (5) defining and characterizing sets of color control parameters used in the corresponding sets of color control functions, (6) inserting initial values into the corresponding sets of LUTs: Pushbutton Reset, (7) calculating and assigning new values to the corresponding sets of LUTs: Pushbutton Control. (8) calculating and assigning values to the output video image featuring the new chromatic components Cr' and Cb', and (9) displaying the output video image, featuring the individual color change.

According to the present invention, there is provided a method of selectively controlling an individual color of a digital video input image, the steps of the method being performed by a data processor, the method comprising the steps of: (a) receiving the digital video input image, featuring pixels; (b) characterizing the digital video input image and its target output image; (c) selecting an individual color of the digital video input image to be controlled; (d) defining a set of individual color look-up-tables according to an individual color; (e) defining a set of individual color control functions according to an individual color for calculating values in the set of individual color look-up-tables; (f) assigning values to color control parameters in the set of individual color control functions; (g) inserting initial values into the set of individual color look-up-tables; (h) determining new values in the set of individual color look-up-tables; (i) determining values of pixels in the target output image from the new values in the set of individual color look-up-tables; and (i) displaying the target output image on a video display device, the target output image includes a change in an individual color of the digital video input image, whereby all other colors of the digital video input image remain unchanged.

According to the present invention, there is provided a method of selectively controlling an individual color of a digital video input image, the steps of the method being performed by a data processor, the method comprising the steps of: (a) receiving the digital video input image, featuring pixels; (b) characterizing the digital video input image and its target output image; (c) selecting an individual color of the digital video input image to be controlled; (d) defining a set of individual color look-up-tables according to an individual color; (e) defining a set of individual color control functions according to an individual color for calculating values in the set of individual color look-up-tables; (f) assigning values to color control parameters in the set of individual color control functions, the color control parameters include a plurality of tangents and a plurality of integer break points, whereby each of the plurality of tangents is used to control saturation of an individual color in the digital video input image, and whereby each of the a plurality of integer break points is the point at which a chromatic curve of an individual color in the digital video input image has a change in slope; (g) inserting initial values into the set of individual color look-up-tables; (h) determining new values in the set of individual color look-up-tables; (i) calculating values of the pixels in the target output image from a linear combination of the new values in the set of the individual color look-up-tables; and (j) displaying the target output image on a video display device, the target output image includes a change in an individual color of the digital video input image Whereby all other colors of the digital video input image remain unchanged.

The present invention could be implemented by hardware or by, software on any operating system of any firmware or a combination thereof. For example, as hardware, the invention could be implemented as a chip or a circuit. As software, the invention could be implemented as a plurality of software instructions being executed by a computer using any suitable operating system. In any case, the steps of the method of the invention could be described as being performed by a data processor, such as a computing platform for executing a plurality of instructions, regardless of the implementation of the present invention.

BRIEF DESCRIPTION OF THE DRAWING

The invention is herein described, by way of example only, with reference to the accompanying drawing, wherein.

DESCRIPTION OF THE PREFERRED EMBODIMENTS

Figure 1:
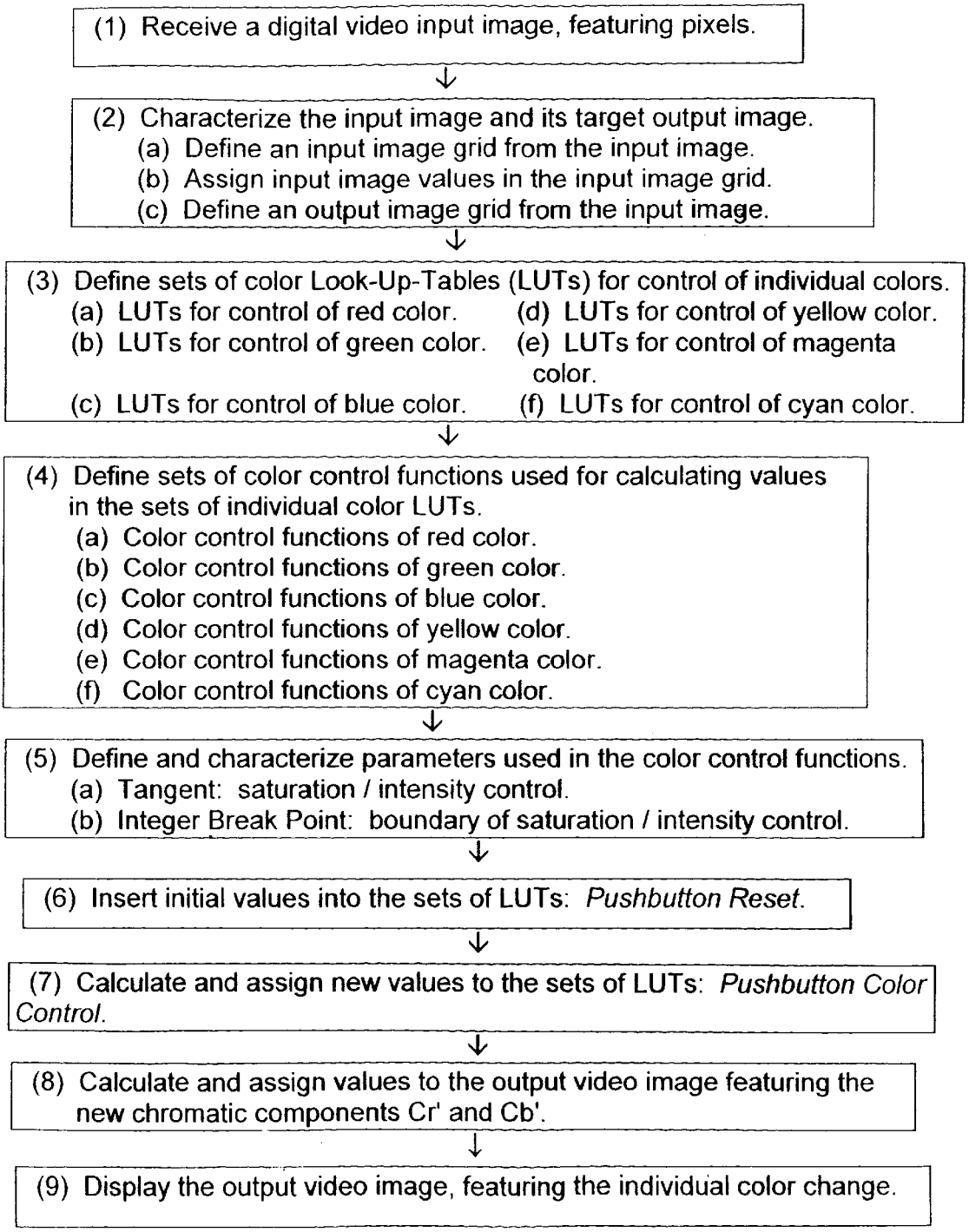
FIG. 1 is a flow diagram of a preferred embodiment of the method of selective color control of digital video images, according to the present invention.

The present invention is of a method of selective color control of digital video images. For purpose of illustration, the following description of the preferred embodiments of the present invention focuses on the CrCb format of the chromatic part of a digital video image. The method of the present invention is applicable to other formats, such as UV or IQ, of a digital video image.

The steps and implementation of the method of selective color control of digital video images, according to the present invention are better understood with reference to the drawing and the accompanying description. It is to be noted that the drawing and accompanying description of the present invention shown here are for illustrative purposes only and are not meant to be limiting.

FIG. 1 is a flow diagram of a preferred embodiment of the method of selective color control of digital video images, according to the present invention. In FIG. 1, each generally applicable, principle step of the method of selective color control of digital video images is numbered and enclosed inside a frame. Notation and symbols appearing in the following description are consistent with those used in FIG. 1. Included in the description of FIG. 1, are definitions of relevant terms, mathematical expressions, and one or more substeps representing further of an indicated principle step of the method of selective color control of digital video images shown in FIG. 1. Substeps are indicated by a letter in parentheses, and the multiplication operation is indicated by an asterisk (*).

Referring now to FIG. 1, a preferred embodiment of the method of selective color control of digital video images, according to the present invention, is as follows.

In Step 1, a digital video input image, having chromatic components, featuring pixels, is received by a data processor.

In Step 2, the input image and its target output image are characterized. In step (a), Cr and Cb are defined as two chromatic components of a digital video input image at time t, Cr or Cb can be plotted in an input image grid (not shown) having an input image grid coordinate system featuring rows (lines) and columns (pixels). Each input image grid location is identified by coordinates of row number i and column number j, such that pixel position coordinates of Cr or Cb, represented as (i,j) in the input image grid are row i and column j. In step (b), values of chromatic components Cr and Cb are assigned into the input image grid. Each chromatic component of the digital video input image, Cr and Cb, is scanned, row by row, pixel by pixel. Each input image pixel value is assigned an address to be operated on by values in the individual color LUTs. Cr(i,j) and Cb(i,j) are defined as digitized pixel values of the input image chromatic components Cr and Cb, respectively, whose position coordinates are (i,j). For an input image chromatic component, Cr or Cb, of size M rows by N columns, pixel position coordinates (i,j) are limited to the input image size as follows: i: 0,1,2, . . . M−1: and j: 0,1,2, . . . N−1.

In step (c) of Step 2, Cr' and Cb' are defined as the two chromatic components of the digital video output image at time t, calculated from the input image chromatic components, Cr and Cb, respectively. Cr' or Cb' can be plotted in an output image grid (not shown) having an output image grid coordinate system featuring rows (lines) and columns (pixels). Each output image grid location is identified by coordinates of row number k and column number l, such that pixel position coordinates of Cr' or Cb', represented as (k,l), in the output image grid are line k and column l. Cr'(k,l) and Cb'(k,l) are defined as digitized pixel values of the output image chromatic components Cr' and Cb', respectively, whose position coordinates are (k,l). In preferred embodiment of the method of the present invention, for an input image chromatic component, Cr or Cb, of size M rows by N columns, pixel position coordinates (k,l) are limited to the input image size as follows: k: 0,1,2, . . . M−1; and l: 0,1,2, . . . N−1, whereby the same memory array is used for the input image and output image chromatic components. In this case, output image pixel position coordinates, k and l, are equivalent to the corresponding input image pixel position coordinates, i.e., k=i, and l=j. Thus, the output image chromatic pixel values Cr'(k,l) and Cb'(k,l), are equivalently written as Cr'(i,j) and Cb'(i,j), respectively.

In Step 3, there is definition of sets of color Look-Up-Tables (LUTs), whose values are to be used for digitized selective control of individual colors, where each color is composed of a linear combination of the input image chromatic components Cr and Cb. The LUTs are defined such that each of the output image chromatic components, Cr' and Cb', is related to the both input image chromatic components, Cr and Cb, and correspondingly, each of the output image chromatic pixel values, Cr'(i,j) and Cb'(i,j) is related to both input image chromatic pixel values, Cr(i,j) and Cb(i,j). In the general case of the preferred embodiment of the present invention, a set of four LUTs are defined for selective control of each individual color as follows:

$LUT^{Cr'}\_Color\_Cr(m)$, relating output image chromatic component, Cr', to input image chromatic component, Cr, $LUT^{Cr'}\_Color\_Cb(m)$, relating output image chromatic component, Cr', to input image chromatic component, Cb, $LUT^{Cb'}\_Color\_Cb(m)$, relating output image chromatic component, Cb', to input image chromatic component, Cb, and $LUT^{Cb'}\_Color\_Cr(m)$, relating output image chromatic component, Cb', to input image chromatic component, Cr.

'm' represents two things, simultaneously: (1) the value of an input image chromatic pixel, Cr(i,j) or Cb(i,j), and, (2) the index of the particular individual color LUT used for changing the saturation of a selected individual color of that chromatic component. The dynamic range of m is determined between the chromatic black level and the chromatic white level of the digitized video input image, and is a function of the number of bits (for example, 6, 8, or 10 bits) per pixel of a given color component of the chromatic part of a video input image. As an example, in the preferred embodiment of the method of the present invention, it is assumed that the chromatic dynamic range is 8-bits, which results in the range of −128 to +127. Adding an offset control, defined as Oc, where in this example, Oc=+128, to m, results in a chromatic dynamic range of 0 to 255. In this case, the chromatic black level is 0, and the chromatic white level is 255.

According to a linear combination of the particular chromatic components of the video input image, any number of different colors can be included in the method of the present invention. For illustration, six different colors, red, green, blue, yellow, magenta, and cyan, are defined and featured hereinafter. The colors red and green are controlled via the chromatic component Cr. The colors blue and yellow are controlled via the chromatic component Cb. Each of the colors magenta and cyan is controlled via a linear combination of both chromatic components Cr and Cb.

In step (a), the following set of LUTs are defined for selective control of red color through input image chromatic components Cr and Cb:

$LUT^{Cr'}\_Red\_Cr(m)$, $LUT^{Cr'}\_Red\_Cb(m)$, $LUT^{Cb'}\_Red\_Cb(m)$, and $LUT^{Cb'}\_Red\_Cr(m)$.

In step (b), the following set of LUTs are defined for selective control of green color through input image chromatic components Cr and Cb:

$LUT^{Cr'}\_Green\_Cr(m)$, $LUT^{Cr'}\_Green\_Cb(m)$, $LUT^{Cb'}\_Green\_Cb(m)$, and $LUT^{Cb'}\_Green\_Cr(m)$.

In step (c), the following set of LUTs are defined for selective control of blue color through input image chromatic components Cr and Cb:

$LUT^{Cr'}\_Blue\_Cr(m)$, $LUT^{Cr'}\_Blue\_Cb(m)$, $LUT^{Cb'}\_Blue\_Cb(m)$, and $LUT^{Cb'}\_Blue\_Cr(m)$.

In step (d), the following set of LUTs are defined for selective control of yellow color through input image chromatic components Cr and Cb:

$LUT^{Cr'}\_Yellow\_Cr(m)$, $LUT^{Cr'}\_Yellow\_Cb(m)$, $LUT^{Cb'}\_Yellow\_Cb(m)$, and $LUT^{Cb'}\_Yellow\_Cr(m)$.

In step (e), the following set of LUTs are defined for selective control of magenta color through input image chromatic components Cr and Cb:

$LUT^{Cr'}\_Magenta\_Cr(m)$, $LUT^{Cr'}\_Magenta\_Cb(m)$.

$LUT^{Cb'}\_Magenta\_Cb(m)$, and $LUT^{Cb'}\_Magenta\_Cr(m)$.

In step (f), the following set of LUTs are defined for selective control of cyan color through input image chromatic components Cr and Cb:

$LUT^{Cr'}\_Cyan\_Cr(m)$, $LUT^{Cr'}\_Cyan\_Cb(m)$, $LUT^{Cb'}\_Cyan\_Cb(m)$, and $LUT^{Cb'}\_Cyan\_Cr(m)$.

In Step 4, there is definition of color control functions, to be used for calculating values in each set of individual color LUTs. Sets of individual color control functions are subsequently used for digitized selective control of individual colors, by operating on linear combinations of values of the input image chromatic components, Cr(i,j) and Cb(i,j). In the general case of the preferred embodiment of the present invention, a set of four color control functions are defined for selective control of each individual color as follows:

$LUT^{Cr'}\_Color\_Cr(m) = Tangent^{Cr'}\_Color\_Cr * [LUT^{Cr'}\_Color\_Cr(m) - M^{Cr'}\_Color\_Cr] + M^{Cr'}\_Color\_Cr$, relating output image chromatic component, Cr', to input image chromatic component, Cr, $LUT^{Cr'}\_Color\_Cb(m) = Tangent^{Cr'}\_Color\_Cb * [LUT^{Cr'}\_Color\_Cb(m) - M^{Cr'}\_Color\_Cb] + M^{Cr'}\_Color\_Cb$, relating output image chromatic component, Cr', to input image chromatic component, Cb, $LUT^{Cb'}\_Color\_Cb(m) = Tangent^{Cb'}\_Color\_Cb * [LUT^{Cb'}\_Color\_Cb(m) - M^{Cb'}\_Color\_Cb] + M^{Cb'}\_Color\_Cb$, relating output image chromatic component, Cb', to input image chromatic component, Cb, and $LUT^{Cb'}\_Color\_Cr(m) = Tangent^{Cb'}\_Color\_Cr * [LUT^{Cb'}\_Color\_Cr(m) - M^{Cr'}\_Color\_Cr] + M^{Cb'}\_Color\_Cr$, relating output image chromatic component, Cb', to input image chromatic component, Cr.

In these sets of color control functions, color control parameters $Tangent^{Cr'}\_Color\_Cr$, $Tangent^{Cr'}\_Color\_Cb$, $Tangent^{Cb'}\_Color\_Cb$, $Tangent^{Cb'}\_Color\_Cr$, and $M^{Cr'}\_Color\_Cr$, $M^{Cr'}\_Color\_Cb$, $M^{Cb'}\_Color\_Cb$, and $M^{Cb'}\_Color\_Cr$, are defined in Step 5, and the symbol*represents the multiplication operation. Consistent with Step 3, for illustration, six sets of color control functions of six different colors, red, green, blue, yellow, magenta, and cyan, are defined and featured hereinafter.

In step (a), the set of color control functions for selective control of red color through input image chromatic components Cr and Cb are:

$LUT^{Cr'}\_Red\_Cr(m) = Tangent^{Cr'}\_Red\_Cr*[LUT^{Cr'}\_Red\_Cr(m) - M^{Cr'}\_Red\_Cr] + M^{Cr'}\_Red\_Cr$, $LUT^{Cr'}\_Red\_Cb(m) = Tangent^{Cr'}\_Red\_Cb*[LUT^{Cr'}\_Red\_Cb(m) - M^{Cr'}{}_{13}\_Red\_Cb] + M^{Cr'}\_Red\_Cb$, $LUT^{Cb'}\_Red\_Cb(m) = Tangent^{Cb'}\_Red\_Cb*[LUT^{Cb'}\_Red\_Cb(m) - M^{Cb'}\_Red\_Cb] + M^{Cb'}\_Red\_Cb$, and $LUT^{Cb'}\_Red\_Cr(m) = Tangent^{Cb'}\_Red\_Cr*[LUT^{Cb'}\_Red\_Cr(m) - M^{Cb'}\_Red\_Cr] + M^{Cb'}\_Red\_Cr$.

In step (b), the set of color control functions for selective control of green color through input image chromatic components Cr and Cb are:

$LUT^{Cr'}\_Green\_Cr(m) = Tangent^{Cr'}\_Green\_Cr*[LUT^{Cr'}\_Green\_Cr(m) - M^{Cr'}\_Green\_Cr] + M^{Cr'}\_Green\_Cr$, $LUT^{Cr'}\_Green\_Cr(m) = Tangent^{Cr'}\_Green\_Cb*[LUT^{Cr'}\_Green\_Cb(m) - M^{Cr'}\_Green\_Cb] + M^{Cr'}\_Green\_Cb$, $LUT^{Cb'}\_Green\_Cb(m) = Tangent^{Cb'}\_Green\_Cb*[LUT^{Cb'}\_Green\_Cb(m) - M^{Cb'}\_Green\_Cb] + M^{Cb'}\_Green\_Cb$, and $LUT^{Cb'}\_Green\_Cr(m) = Tangent^{Cb'}\_Green\_Cr*[LUT^{Cb'}\_Green\_Cr(m) - M^{Cb'}\_Green\_Cr] + M^{Cb'}\_Green\_Cr$.

In step (c), the set of color control functions for selective control of blue color through input image chromatic components Cr and Cb are:

$LUT^{Cr'}\_Blue\_Cr(m) = Tangent^{Cr'}\_Blue\_Cr*[LUT^{Cr'}\_Blue\_Cr(m) - M^{Cr'}\_Blue\_Cr] + M^{Cr'}\_Blue\_Cr$, $LUT^{Cr'}\_Blue\_Cb(m) = Tangent^{Cr'}\_Blue\_Cb*[LUT^{Cr'}\_Blue\_Cb(m) - M^{Cr'}\_Blue\_Cb] + M^{Cr'}\_Blue\_Cb$, $LUT^{Cb'}\_Blue\_Cb(m) = Tangent^{Cb'}\_Blue\_Cb*[LUT^{Cb'}\_Blue\_Cb(m) - M^{Cb'}\_Blue\_Cb] + M^{Cb'}\_Blue\_Cb$, and $LUT^{Cb'}\_Blue\_Cr(m) = Tangent^{Cb'}\_Blue\_Cr*[LUT^{Cb'}\_Blue\_Cr(m) - M^{Cb'}\_Blue\_Cr] + M^{Cb'}\_Blue\_Cr$.

In step (d), the set of color control functions for selective control of yellow color through input image chromatic components Cr and Cb are:

$LUT^{Cr'}\_Yellow\_Cr(m) = Tangent^{Cr'}\_Yellow\_Cr*[LUT^{Cr'}\_Yellow\_Cr(m) - M^{Cr'}\_Yellow\_Cr] + M^{Cr'}\_Yellow\_Cr$, $LUT^{Cr'}\_Yellow\_Cb(m) = Tangent^{Cr'}\_Yellow\_Cb*[LUT^{Cr'}\_Yellow\_Cb(m) - M^{Cr'}\_Yellow\_Cb] + M^{Cr'}\_Yellow\_Cb$, $LUT^{Cb'}\_Yellow\_Cb(m) = Tangent^{Cb'}\_Yellow\_Cb*[LUT^{Cb'}\_Yellow\_Cb(m) - M^{Cb'}\_Yellow\_Cb] + M^{Cb'}\_Yellow\_Cb$, and $LUT^{Cb'}\_Yellow\_Cr(m) = Tangent^{Cb'}\_Yellow\_Cr*[LUT^{Cb'}\_Yellow\_Cr(m) - M^{Cb'}\_Yellow\_Cr] + M^{Cb'}\_Yellow\_Cr$.

In step (e), the set of color control functions for selective control of magenta color through input image chromatic components Cr and Cb are:

$LUT^{Cr'}\_Magenta\_Cr(m) = Tangent^{Cr'}\_Magenta\_Cr*[LUT^{Cr'}\_Magenta\_Cr(m) - M^{Cr'}\_Magenta\_Cr] + M^{Cr'}\_Magenta\_Cr$, $LUT^{Cr'}\_Magenta\_Cb(m) = Tangent^{Cr'}\_Magenta\_Cb*[LUT^{Cr'}\_Magenta\_Cb(m) - M^{Cr'}\_Magenta\_Cb] + M^{Cr'}\_Magenta\_Cb$, $LUT^{Cb'}\_Magenta\_Cb(m) = Tangent^{Cb'}\_Magenta\_Cb*[LUT^{Cb'}\_Magenta\_Cb(m) - M^{Cb'}\_Magenta\_Cb] + M^{Cb'}\_Magenta\_Cb$, and $LUT^{Cb'}\_Magenta\_Cr(m) = Tangent^{Cb'}\_Magenta\_Cr*[LUT^{Cb'}\_Magenta\_Cb(m) - M^{Cb'}\_Magenta\_Cr] + M^{Cb'}\_Magenta\_Cr$.

In step (f), the set of color control functions for selective control of cyan color through input image chromatic components Cr and Cb are:

$LUT^{Cr'}\_Cyan\_Cr(m) = Tangent^{Cr'}\_Cyan\_Cr*[LUT^{Cr'}\_Cyan\_Cr(m) - M^{Cr'}\_Cyan\_Cr] + M^{Cr'}\_Cyan_{Cr}$, $LUT^{Cr'}\_Cyan\_Cb(m) = Tangent^{Cr'}\_Cyan\_Cb*[LUT^{Cr'}\_Cyan\_Cb(m) - M^{Cr'}\_Cyan\_Cb] + M^{Cr'}\_Cyan\_Cb$, $LUT^{Cb'}\_Cyan\_Cb(m) = Tangent^{Cb'}\_Cyan\_Cb*[LUT^{Cb'}\_Cyan\_Cb(m) - M^{Cb'}\_Cyan\_Cb] + M^{Cb'}Cyan\_Cb$, and $LUT^{Cb'}\_Cyan\_Cr(m) = Tangent^{Cb'}\_Cyan\_Cr*[LUT^{Cb'}\_Cyan\_Cr(m) - M^{Cb'}\_Cyan\_Cr] + M^{Cb'}Cyan\_Cr$.

In Step 5, Tangent and Integer Break Point color control parameters, are defined and characterized.

In step (a), Tangent color control parameters, $Tangent^{Cr'}\_Color\_Cr$, $Tangent^{Cr'}\_Color\_Cb$, $Tangent^{Cb'}\_Color\_Cb$, $Tangent^{Cb'}\_Color\_Cr$, are defined as real positive parameters, greater than or equal to zero. Tangent color control parameters are used as free parameters in the color control function, for selectively controlling the saturation, or intensity, of selected individual color, Color, of the video input image, without affecting the remaining colors of the video input image. In each set of color control functions (defined in Step 4), there is a corresponding set of four Tangent color control parameters, whereby, in each set, two Tangent color control parameters, $Tangent^{Cr'}\_Color\_Cr$, and $Tangent^{Cr'}\_Color\_Cb$, appear in the color control functions for relating the output image chromatic component, Cr', to input image chromatic components, Cr and Cb, and two Tangent color control parameters, $Tangent^{Cb'}\_Color\_Cb$, and $Tangent^{Cb'}\_Color\_Cr$, appear in the color control functions for relating the output image chromatic component, Cb', to input image chromatic components, Cr and Cb.

In the preferred embodiment of the method of the present invention, featuring selective control of six individual colors, there are twenty-four independent Tangent color control parameters, i.e., for red color control, $Tangent^{Cr'}\_Red\_Cr$, $Tangent^{Cr'}\_Red\_Cb$, $Tangent^{Cb'}\_Red\_Cb$, and $Tangent^{Cb'}\_Red\_Cr$; for green color control, $Tangent^{Cr'}\_Green\_Cr$, $Tangent^{Cr'}\_Green\_Cb$, $Tangent^{Cb'}\_Green\_Cb$, and $Tangent^{Cb'}\_Green\_Cr$; for blue color control, $Tangent^{Cr'}\_Blue\_Cr$, $Tangent^{Cr'}\_Blue\_Cb$, $Tangent^{Cb'}\_Blue\_Cb$, and $Tangent^{Cb'}\_Blue\_Cr$; for yellow color control, $Tangent^{Cr'}\_Yellow\_Cr$, $Tangent^{Cr'}\_Yellow\_Cb$, $Tangent^{Cb'}\_Yellow\_Cb$, and $Tangent^{Cb'}\_Yellow\_Cr$; for magenta color control, $Tangent^{Cr'}\_Magenta\_Cr$, $Tangent^{Cr'}\_Magenta\_Cb$, $Tangent^{Cb'}\_Magenta\_Cb$, and $Tangent^{Cb'}\_Magenta\_Cr$; and, for cyan color control, $Tangent^{Cr'}\_Cyan\_Cr$, $Tangent^{Cr'}\_Cyan\_Cb$, $Tangent^{Cb'}\_Cyan\_Cb$, and $Tangent^{Cb'}\_Cyan\_Cr$; corresponding to the six individual colors, red, green, blue, yellow, magenta, and cyan, respectively.

In step (b), integer Break Point color control parameters, $M^{Cr'}\_Color\_Cr$, $M^{Cr'}\_Color\_Cb$, $M^{Cb'}\_Color\_Cb$, and $M^{Cb'}\_Color\_Cr$, are defined. Each Integer Break Point color control parameter represents the point, or value, at which the chromatic function (or chromatic curve, as may be appropriately drawn in a color coordinate system) of a selected individual color, Color, exhibits a change in its slope. Values of Integer Break Point parameters are chosen according to the format of the chromatic part of the video input image, e.g., CrCb, UV, or IQ. In the preferred embodiment of the method of the present invention, featuring chromatic components Cr and Cb, Integer Break Point values are in the range of 0 to 255.

In each set of color control functions (defined in Step 4), there is a corresponding set of four Integer Break Point color control parameters, whereby, in each set, two Integer Break Point color control parameters, $M^{Cr'}$_Color_Cr, and $M^{Cr'}$_Color_Cb, appear in the color control functions for relating the output image chromatic component, Cr', to input image chromatic components, Cr and Cb, and two Integer Break Point color control parameters, $M^{Cb'}$_Color_Cb, and $M^{Cb'}$_Color_Cr, appear in the color control functions for relating the output image chromatic component, Cb', to input image chromatic components, Cr and Cb.

In the preferred embodiment of the method of the present invention, featuring selective control of six individual colors, there are twenty-four independent Integer Break Point color control parameters, i.e., for red color control, $M^{Cr'}$_Red_Cr, $M^{Cr'}$_Red_Cb, $M^{Cb'}$_Red_Cb, and $M^{Cb'}$_Red_Cr; for green color control, $M^{Cr'}$_Green_Cr, $M^{Cr'}$_Green_Cb, $M^{Cb'}$_Green_Cb, and $M^{Cb'}$_Green_Cr; for blue color control, $M^{Cr'}$_Blue_Cr, $M^{Cr'}$_Blue_Cb, $M^{Cb'}$_Blue_Cb, and $M^{Cb'}$_Blue_Cr: for yellow color control, $M^{Cr'}$_Yellow_Cr, $M^{Cr'}$_Yellow_Cb, $M^{Cb'}$_Yellow_Cb, and $M^{Cb'}$_Yellow_Cr; for magenta color control, $M^{Cr'}$_Magenta_Cr, $M^{Cr'}$_Magenta_Cb, $M^{Cb'}$_Magenta_Cb, and $M^{Cb'}$_Magenta_Cr; and, for cyan color control, $M^{Cr'}$_Cyan_Cr, $M^{Cr'}$_Cyan_Cb, $M^{Cb'}$_Cyan_Cb, and $M^{Cb'}$_Cyan_Cr; corresponding to the six individual colors, red, green, blue, yellow, magenta, and cyan, respectively.

In the method of the present invention, the novel utility of using the Tangent and Integer Break Point color control parameters, is that using the individual sets of color control functions, represents changing (controlling) the slope (tangent) of a particular chromatic function (curve) in several different alternative ways, including: from an initial value to an integer break point, or, between two integer break points, or, from an integer break point to an upper limit value, within a particular chromatic dynamic range of a specified chromatic part of a digital video input image, without affecting the slopes (tangents) of the remaining color components of each chromatic part of the same digital video input image. Since saturation or intensity of an individual color component is directly related to the tangent of the chromatic curve of that color component, using sets of individual color control functions for operating on the chromatic parts, Cr and Cb, of the digital video input image, represents changing or controlling the saturation or intensity of a selected individual color component, without affecting the saturations or intensities of the remaining color components of the specified chromatic part of the digital video input image.

Values of the Integer Break Point color control parameters, for each individual color, Colors are assigned once and used repeatedly by the data processor in all requests for selective change of a color, Color, of a given digital video input image. In contrast, values of the Tangent color control parameters, for each individual color, Color, are assigned anew and used by the data processor in each separate request for selective color change of a color, Color, of a given digital video input image. In terms of practical implementation of the preferred embodiment of the method of the present invention, values of the Integer Break Point parameters, and the Tangent parameters, for each individual color, are factory set at the time of finalizing or adjusting the initial settings of the data processor (e.g., TV or video system controller). During viewer use of the TV or video system controller, values of Integer Break Point parameters remain constant and are not changed by viewer request of selective color changes. In contrast, values of Tangent parameters are changed, within the range of initial factory settings of Tangent parameters, each time there is a viewer request of selective color change. For example, change in values of Tangent parameters may be in the form of a viewer pushing a button, designated to affect an individual color change, as part of the TV or video system controller. Further of this example, a designated pushbutton on a TV or video system controller could have two push options, one for increasing the saturation of a selected individual color, and one for decreasing the saturation of a selected individual color, with such options possibly indicated by a '+' or '−' on the controller device, for increasing or decreasing, respectively, the saturation of the selected individual color.

In Step 6, there is insertion of initial values into each set of individual color LUTs, also identified as Pushbutton Reset. The function of Pushbutton Reset is, that when the data processor (e.g., TV or video system controller) is initially turned on, each set of the individual color LUTs is assigned initial values (i.e., resetting of the controller pushbuttons used for selective color control of the video image), which may also include the set of values last appearing in the individual color LUTs at the time the data processor (controller) was last turned off.

In the general case, for a known chromatic dynamic range of m between $m_1$ and $m_2$, initial values are inserted into each set of color LUTs, corresponding to each individual color, Color, as follows: for $m=m_1$ to $m_2$, where m is described in Step 3, assign:

$LUT^{Cr'}$_Color_Cr(m)=m,
$LUT^{Cr'}$_Color_Cb(m)=m,
$LUT^{Cb'}$_Color_Cb(m)=m, and
$LUT^{Cb'}$_Color_Cr(m)=m.

In the preferred embodiment of the method of the present invention, featuring six individual color components of the chromatic part of the video input image, each having a chromatic dynamic range of $m_1=0$ to $m_2=255$, initial values are inserted into each set of the individual color LUTs as follows: for m=0 to 255, assign:

Red Color Control:

$LUT^{Cr'}$_Red_Cr(m)=m,
$LUT^{Cr'}$_Red_Cb(m)=m,
$LUT^{Cb'}$_Red_Cb(m)=m, and
$LUT^{Cb'}$_Red_Cr(m)=m.

Green Color Control:

$LUT^{Cr'}$_Green_Cr(m)=m,
$LUT^{Cr'}$_Green_Cb(m)=m,
$LUT^{Cb'}$_Green_Cb(m)=m, and
$LUT^{Cb'}$_Green_Cr(m)=m.

Blue Color Control:

$LUT^{Cr'}$_Blue_Cr(m)=m,
$LUT^{Cr'}$_Blue_Cb(m)=m,
$LUT^{Cb'}$_Blue_Cb(m)=m, and
$LUT^{Cb'}$_Blue_Cr(m)=m.

Yellow Color Control:

$LUT^{Cr'}$_Yellow_Cr(m)=m,
$LUT^{Cr'}$_Yellow_Cb(m)=m
$LUT^{Cb'}$_Yellow_Cb(m)=m, and
$LUT^{Cb'}$_Yellow_Cr(m)=m.

Magenta Color Control:

$LUT^{Cr'}$_Magenta_Cr(m)=m,
$LUT^{Cr'}$_Magenta_Cb(m)=m,
$LUT^{Cb'}$_Magenta_Cb(m)=m, and $LUT^{Cb'}\_Magenta\_Cr(m)=m$.

Cyan Color Control:

$LUT^{Cr'}\_Cyan\_Cr(m)=m$, $LUT^{Cr'}\_Cyan\_Cb(m)=m$, $LUT^{Cb'}\_Cyan\_Cb(m)=m$, and $LUT^{Cb'}\_Cyan\_Cr(m)=m$.

The effect of the Pushbutton Reset step is to provide an initially linear relation between each set of individual color LUTs and the parameter m, where, by referring to the generalized set of color control functions, $LUT^{Cr'}\_Color\_Cr(m)=Tangent^{Cr'}\_Color\_Cr*[LUT^{Cr'}\_Color\_Cr(m)-M^{Cr'}\_Color\_Cr]+M^{Cr'}\_Color\_Cr$, $LUT^{Cr'}\_Color\_Cb(m)=Tangent^{Cr'}\_Color\_Cb*[LUT^{Cr'}\_Color\_Cb(m)-M^{Cr'}\_Color\_Cb]+M^{Cr'}\_Color\_Cb$, $LUT^{Cb'}\_Color\_Cb(m)=Tangent^{Cb'}\_Color\_Cb*[LUT^{Cb'}\_Color\_Cb(m)-M^{Cb'}\_Color\_Cb]+M^{Cb'}\_Color\_Cb$, and $LUT^{Cb'}\_Color\_Cr(m)=Tangent^{Cb'}\_Color\_Cr*[LUT^{Cb'}\_Color\_Cr(m)-M^{Cb'}\_Color\_Cr]+M^{Cb'}\_Color\_Cr$, the slope of each equation is a corresponding Tangent color control parameter, equal to one, and the y-intercept of each equation is a corresponding Integer Break Point color control parameter, equal to zero. Thus, initial values inserted into each set of individual color LUTs are equivalent to the values of m, which according to the definition of mn, represents the chromatic pixel values, $Cr(i,j)$ or $Cb(i,j)$, of the video input image, that are located at the address $(i,j)$ in the video input image grid. Simultaneously, according to the definition of m, which also represents the location index of a value in a particular color LUT, these initial LUT values have location indices, m, in the individual color LUTs.

In Step 7, there is calculation and assignment of new values into the sets of individual color LUTs, also identified as Pushbutton Color Control. The function of Pushbutton Color Control is, that when the data processor (e.g., TV or video system controller) is in the 'on' mode, following completion of the Pushbutton Reset step, request by a viewer for a selected individual color change (e.g., by depression of a pushbutton designated to the selected individual color, as part of operation of a TV or video system controller) causes a new set of values to be inserted into each corresponding set of LUTs of the selected color. Step 7 is in preparation for the next step (Step 8), involving calculations of the particular color control function operating on a linear combination of the chromatic components, Cr and Cb, of the video input image.

Step 7 is also performed in the event that a viewer desires to change either the same, or a different, color of the digital video image, following completion of a previous color change in the digital video image. This next request by a viewer for a selected individual color change (e.g., by depression of a pushbutton designated to the selected individual color, as part of operation of a TV or video system controller) causes a response by the data processor to initialize values in the set of color LUTs of this next selected color, via action of the Pushbutton Reset step (Step 6), whereby previous modifications to the set of color LUTs of the newly selected color are erased. Following completion of this Pushbutton Reset step, the data processor performs the Pushbutton Color Control step, in order to effect the change in the newly selected individual color of the digital video image, by calculating and inserting new values into the set of color LUTs of the newly selected individual color of the digital video image.

In Step 7, in the general case, for a selected individual color change, for values of m from $m_{initial}$ to $m_{final}$, where $m_{initial}$ and $m_{final}$ are known values within the general chromatic dynamic range of $m_1$ to $m_2$, including values of 0 to 255 as in this embodiment, or values of known Integer Break Points, and where values of $m_{initial}$ and $m_{final}$ can vary for the calculation of values in each color LUT, new values are inserted into each color LUT within each particular set of color LUTs as follows:

For $m=m_{initial}$ to $m_{final}$, assign: $LUT^{Cr'}\_Color\_Cr(m)=Tangent^{Cr'}\_Color\_Cr*[LUT^{Cr'}\_Color\_Cr(m)-M^{Cr'}\_Color\_Cr]+M^{Cr'}\_Color\_Cr$, relating output image chromatic component, Cr', to input image chromatic component, Cr, For $m=m_{initial}$ to $m_{final}$, assign: $LUT^{Cr'}\_Color\_Cb(m)=Tangent^{Cr'}\_Color\_Cb*[LUT^{Cr'}\_Color\_Cb(m)-M^{Cr'}\_Color\_Cb]+M^{Cr'}\_Color\_Cb$, relating output image chromatic component, Cr', to input image chromatic component, Cb, For $m=m_{initial}$ to $m_{final}$, assign: $LUT^{Cb'}\_Color\_Cb(m)=Tangent^{Cb'}\_Color\_Cb*[LUT^{Cb'}\_Color\_Cb(m)-M^{Cb'}\_Color\_Cb]+M^{Cb'}\_Color\_Cb$, relating output image chromatic component, Cb', to input image chromatic component, Cb, and For $m=m_{initial}$ to $m_{final}$, assign: $LUT^{Cb'}\_Color\_Cr(m)=Tangent^{Cb'}\_Color\_Cr*[LUT^{Cb'}\_Color\_Cr(m)-M^{Cb'}\_Color\_Cr]+M^{Cb'}\_Color\_Cr$, relating output image chromatic component, Cb', to input image chromatic component, Cr. Tangent and Integer Break Point color control parameters are defined and characterized in Step 5, and the initial value of each corresponding color control function appearing in the bracketed term is assigned according to Pushbotton Reset (Step 6).

In the general case of inserting new values into the sets of individual color LUTs, values obtained from calculations of the sets of individual color control functions, are considered either valid or invalid, according to comparison of these values to specified values of the chromatic dynamic range of $m_1$ to $m_2$. Valid values are inside the chromatic dynamic range of $m_1$ to $m_2$, and invalid values are outside the chromatic dynamic range of $m_1$ to $m_2$. Invalid values are replaced with valid cutoff values. For determining a value to be either valid or invalid, and replacing an invalid value, the following LUT cutoff conditions and cutoff values are used: if value of a color control function<0, (invalid value), then value of that color control function=$m_1$, (valid value), or, if value of a color control function>$m_2$, (invalid value), then value of that color control function=$m_2$ (valid value). Cutoff values are determined from the chromatic dynamic range (Step 3), where the dynamic range of m is determined between the chromatic black level and the chromatic white level of the digitized video input image, and is a function of the number of bits (for example, 6, 8, or 10 bits) per pixel of a given color component of the chromatic part of a video input image.

In the preferred embodiment of the method of the present invention, featuring six individual color components, red, green, blue, yellow, magenta, and cyan, as linear combinations of the chromatic parts Cr and Cb, of the video input image, each having a chromatic dynamic range of $m_1=0$ to $m_2=255$, corresponding to 8-bits, new values are inserted into the sets of individual color LUTs as follows:

Red Color Control:

For $m=M^{Cr'}\_Red\_Cr$ to 255, assign:
$LUT^{Cr'}\_Red\_Cr(m)=Tangent^{Cr'}\_Red\_Cr*[LUT^{Cr'}\_Red\_Cr(m)-M^{Cr'}\_Red\_Cr]+M^{Cr'}\_Red\_Cr$, For $m=M^{Cr'}\_Red\_Cb$ to 255, assign:
$LUT^{Cr'}\_Red\_Cb(m)=Tangent^{Cr'}\_Red\_Cb*[LUT^{Cr'}\_Red\_Cb(m)-M^{Cr'}\_Red\_Cb]+M^{Cr'}\_Red\_Cb$, For $m=M^{Cb'}\_Red\_Cb$ to 255, assign:

$LUT^{Cb'}\_Red\_Cb(m) = Tangent^{Cb'}\_Red\_Cb*$
$[LUT^{Cb'}\_Red\_Cb(m) - M^{Cb'}\_Red\_Cb] + M^{Cb'}\_Red\_Cb$, and For $m = M^{Cb'}\_Red\_Cr$ to 255, assign:
$LUT^{Cb'}\_Red\_Cr(m) = Tangent^{Cb'}\_Red\_Cr*$
$[LUT^{Cb'}\_Red\_Cr(m) - M^{Cb'}\_Red\_Cr] + M^{Cb'}\_Red\_Cr$, where, for calculation of new values in each LUT of the set of four red color LUTs, red color cutoff values are assigned as follows: if value of red color control function<0, (invalid value), then new value of red color control function=0, (valid value), or, if value of red color control function>255, (invalid value), then new value of red color control function=255, (valid value).

Green Color Control:

For $m = 0$ to $M^{Cr'}\_Green\_Cr$, assign:
$LUT^{Cr'}\_Green\_Cr(m) = Tangent^{Cr'}\_Green\_Cr*$
$[LUT^{Cr'}\_Green\_Cr(m) - M^{Cr'}\_Green\_Cr] + M^{Cr'}\_Green\_Cr$, For $m = 0$ to $M^{Cr'}\_Green\_Cb$, assign:
$LUT^{Cr'}\_Green\_Cb(m) = Tangent^{Cr'}\_Green\_Cb*$
$[LUT^{Cr'}\_Green\_Cb(m) - M^{Cr'}\_Green\_Cb] + M^{Cr'}\_Green\_Cb$, For $m = 0$ to $M^{Cb'}\_Green\_Cb$, assign:
$LUT^{Cb'}\_Green\_Cb(m) = Tangent^{Cb'}\_Green\_Cb*$
$[LUT^{Cb'}\_Green\_Cb(m) - M^{Cb'}\_Green\_Cb] + M^{Cb'}\_Green\_Cb$, and For $m = 0$ to $M^{Cb'}\_Green\_Cr$, assign:
$LUT^{Cb'}\_Green\_Cr(m) = Tangent^{Cb'}\_Green\_Cr*$
$[LUT^{Cb'}\_Green\_Cr(m) - M^{Cb'}\_Green\_Cr] + M^{Cb'}\_Green\_Cr$, where, for calculation of new values in each LUT of the set of four green color LUTs, green color cutoff values are assigned as follows: if value of green color control function<0, (invalid value), then new value of green color control function=0, (valid value), or, if value of green color control function>255, (invalid value), then new value of green color control function=255, (valid value).

Blue Color Control:

For $m = 0$ to $M^{Cr'}\_Blue\_Cr$, assign:
$LUT^{Cr'}\_Blue\_Cr(m) = Tangent^{Cr'}\_Blue\_Cr*$
$[LUT^{Cr'}\_Blue\_Cr(m) - M^{Cr'}\_Blue\_Cr] + M^{Cr'}\_Blue\_Cr$, For $m = 0$ to $M^{Cr'}\_Blue\_Cb$, assign:
$LUT^{Cr'}\_Blue\_Cb(m) = Tangent^{Cr'}\_Blue\_Cb*$
$[LUT^{Cr'}\_Blue\_Cb(m) - M^{Cr'}\_Blue\_Cb] + M^{Cr'}\_Blue\_Cb$, For $m = 0$ to $M^{Cb'}\_Blue\_Cb$, assign:
$LUT^{Cb'}\_Blue\_Cb(m) = Tangent^{Cb'}\_Blue\_Cb*$
$[LUT^{Cb'}\_Blue\_Cb(m) - M^{Cb'}\_Blue\_Cb] + M^{Cb'}\_Blue\_Cb$, and For $m = 0$ to $M^{Cb'}\_Blue\_Cr$, assign:
$LUT^{Cb'}\_Blue\_Cr(m) = Tangent^{Cb'}\_Blue\_Cr*$
$[LUT^{Cb'}\_Blue\_Cr(m) - M^{Cb'}\_Blue\_Cr] + M^{Cb'}\_Blue\_Cr$, where, for calculation of new values in each LUT of the set of four blue color LUTs, blue color cutoff values are assigned as follows: if value of blue color control function<0, (invalid value), then new value of blue color control function=0, (valid value), or, if value of blue color control function>255, (invalid value), then new value of blue color control function=255, (valid value).

Yellow Color Control:

For $m = M^{Cr'}\_Yellow\_Cr$ to 255, assign:
$LUT^{Cr'}\_Yellow\_Cr(m) = Tangent^{Cr'}\_Yellow\_Cr*$
$[LUT^{Cr'}\_Yellow\_Cr(m) - M^{Cr'}\_Yellow\_Cr] + M^{Cr'}\_Yellow\_Cr$, For $m = M^{Cr'}\_Yellow\_Cb$ to 255, assign:
$LUT^{Cr'}\_Yellow\_Cb(m) = Tangent^{Cr'}\_Yellow\_Cb*$
$[LUT^{Cr'}\_Yellow\_Cb(m) - M^{Cr'}\_Yellow\_Cb] + M^{Cr'}\_Yellow\_Cb$, For $m = M^{Cb'}\_Yellow\_Cb$ to 255, assign:
$LUT^{Cb'}\_Yellow\_Cb(m) = Tangent^{Cb'}\_Yellow\_Cb*$
$[LUT^{Cb'}\_Yellow\_Cb(m) - M^{Cb'}\_Yellow\_Cb] + M^{Cb'}\_Yellow\_Cb$, and For $m = M^{Cb'}\_Yellow\_Cr$ to 255, assign:
$LUT^{Cb'}\_Yellow\_Cr(m) = Tangent^{Cb'}\_Yellow\_Cr*$
$[LUT^{Cb'}\_Yellow\_Cr(m) - M^{Cb'}\_Yellow\_Cr] + M^{Cb'}\_Yellow\_Cr$, where, for calculation of new values in each LUT of the set of four yellow color LUTs, yellow color cutoff values are assigned as follows: if value of yellow color control function<0, (invalid value), then new value of yellow color control function=0, (valid value), or, if value of yellow color control function>255, (invalid value), then new value of yellow color control function=255, (valid value).

Magenta Color Control:

For $m = m_{initial}$ to $m_{final}$, assign:
$LUT^{Cr'}\_Magenta\_Cr(m) = Tangent^{Cr'}\_Magenta\_Cr*$
$[LUT^{Cr'}\_Magenta\_Cr(m) - M^{Cr'}\_Magenta\_Cr] + M^{Cr'}\_Magenta\_Cr$, For $m = m_{initial}$ to $m_{final}$, assign:
$LUT^{Cr'}\_Magenta\_Cb(m) = Tangent^{Cr'}\_Magenta\_Cb*$
$[LUT^{Cr'}\_Magenta\_Cb(m) - M^{Cr'}\_Magenta\_Cb] + M^{Cr'}\_Magenta\_Cb$, For $m = m_{initial}$ to $m_{final}$, assign:
$LUT^{Cb'}\_Magenta\_Cb(m) = Tangent^{Cb'}\_Magenta\_Cb*$
$[LUT^{Cb'}\_Magenta\_Cb(m) - M^{Cb'}\_Magenta\_Cb] + M^{Cb'}\_Magenta\_Cb$, and For $m = m_{initial}$ to $m_{final}$, assign:
$LUT^{Cb'}\_Magenta\_Cr(m) = Tangent^{Cb'}\_Magenta\_Cr*$
$[LUT^{Cb'}\_Magenta\_Cr(m) - M^{Cb'}\_Magenta\_Cr] + M^{Cb'}\_Magenta\_Cr$, where, for calculation of new values in each LUT of the set of four magenta color LUTs, magenta color cutoff values are assigned as follows: if value of magenta color control function<0, (invalid value), then new value of magenta color control function=0, (valid value), or, if value of magenta color control function>255, (invalid value), then new value of magenta color control function=255, (valid value).

Cyan Color Control:

For $m = m_{initial}$ to $m_{final}$, assign:
$LUT^{Cr'}\_Cyan\_Cr(m) = Tangent^{Cr'}\_Cyan\_Cr*$
$[LUT^{Cr'}\_Cyan\_Cr(m) - M^{Cr'}\_Cyan\_Cr] + M^{Cr'}\_Cyan\_Cr$, For $m = m_{initial}$ to $m_{final}$, assign:
$LUT^{Cr'}\_Cyan\_Cb(m) = Tangent^{Cr'}\_Cyan\_Cb*$
$[LUT^{Cr'}\_Cyan\_Cb(m) - M^{Cr'}\_Cyan\_Cb] + M^{Cr'}\_Cyan\_Cb$, For $m = m_{initial}$ to $m_{final}$, assign:
$LUT^{Cb'}\_Cyan\_Cb(m) = Tangent^{Cb'}\_Cyan\_Cb*$
$[LUT^{Cb'}\_Cyan\_Cb(m) - M^{Cb'}\_Cyan\_Cb] + M^{Cb'}\_Cyan\_Cb$, and For $m = m_{initial}$ to $m_{final}$, assign:
$LUT^{Cb'}\_Cyan\_Cr(m) = Tangent^{Cb'}\_Cyan\_Cr*$
$[LUT^{Cb'}\_Cyan\_Cr(m) - M^{Cb'}\_Cyan\_Cr] + M^{Cb'}\_Cyan\_Cr$, where, for calculation of new values in each LUT of the set of four cyan color LUTs, cyan color cutoff values are assigned as follows: if value of cyan color control function<0, (invalid value), then new value of cyan color control function=0, (valid value), or, if value of cyan color control function>255, (invalid value), then new value of cyan color control function=255 (valid value).

The effect of the Pushbutton Reset step is to provide the actual, or working, new functional relation between each set of individual color LUTs and the parameter m, where, by referring to the generalized set of color control functions, $LUT^{Cr'}\_Color\_Cr(m)=Tangent^{Cr'}\_Color\_Cr*[LUT^{Cr'}\_Color\_Cr_{(m)-M}^{Cr'}\_Color\_Cr]+M^{Cr'}\_Color\_Cr$, $LUT^{Cr'}\_Color\_Cb(m)=Tangent^{Cr'}\_Color\_Cb*[LUT^{Cr'}\_Color\_Cb(m)-M^{Cr'}\_Color\_Cb]+M^{Cr'}\_Color\_Cb$, $LUT^{Cb'}\_Color\_Cb(m)=Tangent^{Cb'}\_Color\_Cb*[LUT^{Cb'}\_Color\_Cb(m)-M^{Cb'}\_Color\_Cb]+M^{Cb'}\_Color\_Cb$, and $LUT^{Cb'}\_Color\_Cr(m)==Tangent^{Cb'}\_Color\_Cr*[LUT^{Cb'}\_Color\_Cr(m)-M^{Cb'}\_Color\_Cr]+M^{Cb'}\_Color\_Cr$, the slope of each equation is a corresponding Tangent color control parameter, which varies from greater than or equal to zero, and the y-intercept of each equation is a corresponding Integer Break Point color control parameter, which varies in the chromatic dynamic range, from 0 to 255, in this example. Thus, new values inserted into each set of selected individual color component LUTs are linear functions of the values mn, representing chromatic pixel values, $Cr(i,j)$ or $Cb(i,j)$, of the video input image, which are located at the address (i,j) in the video input image grid. Simultaneously, according to the definition of m, which also represents the location index of a value in a particular color LUT, these new LUT values have location indices, m, in the individual color LUTs.

In Step 8, there is calculation and assignment of values to the target output video image, featuring the new chromatic components, $Cr'(k,l)$ and $Cb'(k,l)$. In the general case, output pixel values featuring the new chromatic components, $Cr'(k,l)$ and $Cb'(k,l)$, are obtained by having the individual color LUTs operate on a linear combination of the input image chromatic components, $Cr(i,j)$ and $Cb(i,j)$.

In the preferred embodiment of the method of the present invention, for an input image chromatic component, Cr or Cb, of size M rows by N columns, output image chromatic pixel position coordinates (k,l) are limited to the input image size as follows: row number, k: 0,1,2, . . . M−1; and column number, l: 0,1,2, . . . N−1, whereby the same memory array is used for the input image and output image chromatic components. In this case, output image pixel position coordinates, k and l, are equivalent to the corresponding input image pixel position coordinates, i.e., k=i, and l=j. Thus, the output image chromatic components, $Cr'(k,l)$ and $Cb'(k,l)$ are equivalently written as $Cr'(i,j)$ and $Cb'(i,j)$, respectively.

In the general case, output pixel values featuring the new chromatic components, $Cr'(i,j)$ and $Cb'(i,j)$, are obtained by having the individual color LUTs operate on a linear combination of the input image chromatic components, $Cr(i,j)$ and $Cb(i,j)$, as follows:

For i=0 to M−1, and j=0 to N−1:
  $Cr'(i,j)=u_1*LUT^{Cr'}\_Color\_Cr[Cr(i,j)]+v_1*LUT^{Cr'}\_Color\_Cb[Cb(i,j)]+w_1$, and
  $Cb'(i,j)=u_2 LUT^{Cb'}\_Color\_Cr[Cr(i,j)]+v_2*LUT^{Cb'}\_Color\_Cb[Cb(i,j)]+w_2$, where $u_1$, $v_1$, $w_1$, and $u_2$, $v_2$, $w_2$, are real valued parameters greater than or equal to zero.

In Step 8, in the preferred embodiment of the method of the present invention, featuring six individual color components of the chromatic part of the video input image, output image pixel values featuring the new chromatic components, $Cr'(i,j)$ and $Cb'(i,j)$, are obtained by having the individual color LUTs operate on a linear combination of the input image chromatic components, $Cr(i,i)$ and $Cb(i,j)$, as follows:

Red Color Control:
  For i=0 to M−1, and j=0 to N−1:
    $Cr'(i,j)=x_1*LUT^{Cr'}\_Red\_Cr[Cr(i,j)]+y_1*LUT^{Cr'}\_Red\_Cb[Cb(i,j)]+z_1$, and
    $Cb'(i,j)=x_2*LUT^{Cb'}\_Red\_Cr[Cr(i,j)]+y_2*LUT^{Cb'}\_Red\_Cb[Cb(i,j)]+z_2$, where $x_1$, $y_1$, $z_1$, and $x_2$, $y_2$, $z_2$, are real valued parameters greater than or equal to zero.

In a particular example of the preferred embodiment of the method of the present invention, individual color red is selectively controlled through input image chromatic component Cr. Therefore, for selective red color control, output image pixel values featuring the new chromatic component, $Cr'(i,j)$, may be obtained by having the Cr related red color LUT operate on single input image chromatic component, $Cr(i,j)$, as follows:

Red Color Control:
  For i=0 to M−1 and j=0 to N−1:
    $Cr'(i,j)=x_1*LUT^{Cr'}\_Red\_Cr[Cr(i,j)]+z_1$, where, in the general equations for red color control, parameters $y_1$, and $x_2$, $y_2$, $z_2$ equal zero.

Green Color Control:
  For i=0 to M−1, and j=0 to N−1:
    $Cr'(i,j)=x_3*LUT^{Cr'}\_Green\_Cr[Cr(i,j)]+y_3*LUT^{Cr'}\_Green\_Cb[Cb(i,j)]+z_3$, and
    $Cb'(i,j)=x_4*LUT^{Cb'}\_Green\_Cr[Cr(i,j)]+y_4*LUT^{Cb'}\_Green\_Cb[Cb(i,j)]+z_4$, where $x_3$, $y_3$, $z_3$, and $x_4$, $y_4$, $z_4$, are real valued parameters greater than or equal to zero.

In a particular example of the preferred embodiment of the method of the present invention, individual color green is selectively controlled through input image chromatic component Cr. Therefore, for selective green color control, output image pixel values featuring the new chromatic component, $Cr'(i,j)$, may be obtained by having the Cr related green color LUT operate on single input image chromatic component, $Cr(i,j)$, as follows:

Green Color Control:
  For i=0 to M−1, and j=0 to N−1:
    $Cr'(i,j)=x_3*LUT^{Cr'}\_Green\_Cr[Cr(i,j)]+z_3$, where, in the general equations for green color control, parameters $y_3$, and $x_4$, $y_4$, $z_4$ equal zero.

Blue Color Control:
  For i=0 to M−1, and j=0 to N−1:
    $Cr'(i,j)=x_5*LUT^{Cr'}\_Blue\_Cr[Cr(i,j)]+y_5*LUT^{Cr'}\_Blue\_Cb[Cb(i,j)]+z_5$, and
    $Cb'(i,j)=x_6*LUT^{Cb'}\_Blue\_Cr[Cr(i,j)]+y_6*LUT^{Cb'}\_Blue\_Cb[Cb(i,j)]+z_6$, where $x_5$, $y_5$, $z_5$, and $x_6$, $y_6$, $z_6$, are real valued parameters greater than or equal to zero.

In a particular example of the preferred embodiment of the method of the present invention individual color blue is selectively controlled through input image chromatic component Cb. Therefore, for selective blue color control, output image pixel values featuring the new chromatic component, $Cb'(i,j)$, may be obtained by having the Cb related blue color LUT operate on single input image chromatic component, $Cb(i,j)$, as follows:

Blue Color Control:
  For i=0 to M−1, and j=0 to N−1:
    $Cb'(i,j)=y_6*LUT^{Cb'}\_Blue\_Cb[Cb(i,j)]+z_6$, where, in the general equations for blue color control, parameters $x_5$, $y_5$, $z_5$, and $x_5$ equal zero.

Yellow Color Control:

For i=0 to M−1, and j=0 to N−1:
   $Cr'(i,j) = x_7 * LUT^{Cr'}\_Yellow\_Cr[Cr(i,j)] + y_7 * LUT^{Cr'}\_Yellow\_Cb[Cb(i,j)] + z_7$, and
   $Cb'(i,j) = x_8 * LUT^{Cb'}\_Yellow\_Cr[Cr(i,j)] + y_8 * LUT^{Cb'}\_Yellow\_Cb[Cb(i,j)] + z_8$, where $x_7, y_7, z_7$, and $x_8, y_8, z_8$, are real valued parameters greater than or equal to zero.

In a particular example of the preferred embodiment of the method of the present invention, individual color yellow is selectively controlled through input image chromatic component Cb. Therefore, for selective yellow color control, output image pixel values featuring, the new chromatic component, Cb'(i,j), may be obtained by having the Cb related yellow color LUT operate on single input image chromatic component, Cb(i,j), as follows:

Yellow Color Control:
   For i=0 to M−1, and j=0 to N−1:
   $Cb'(i,j) = y_8 * LUT^{Cb'}\_Yellow\_Cb[Cb(i,j)] + z_8$, where, in the general equations for blue color control, parameters $x_7, y_7, z_7$, and $x_8$ equal zero.

Magenta Color Control:
   For i=0 to M−1, and j=0 to N−1:
   $Cr'(i,j) = x_9 * LUT^{Cr'}\_Magenta\_Cr[Cr(i,j)] + y_9 * LUT^{Cr'}\_Magenta\_Cb[Cb(i,j)] + z_9$, and
   $Cb'(i,j) = x_{10} * LUT^{Cb'}\_Magenta\_Cr[Cr(i,j)] + y_{10} * LUT^{Cb'}\_Magenta\_Cb[Cb(i,j)] + z_{10}$, where $x_9, y_9, z_9$, and $x_{10}, y_{10}, z_{10}$, are real valued parameters greater than or equal to zero.

Cyan Color Control:
   For i=0 to M−1, and j=0 to N−1:
   $Cr'(i,j) = x_{11} * LUT^{Cr'}\_Cyan\_Cr[Cr(i,j)] + y_{11} * LUT^{Cr'}\_Cyan\_Cb[Cb(i,j)] + z_{11}$, and
   $Cb'(i,j) = x_{12} * LUT^{Cb'}\_Cyan\_Cr[Cr(i,j)] + y_{12} * LUT^{Cb'}\_Cyan\_Cb[Cb(i,j)] + z_{12}$, where $x_{11}, y_{11}, z_{11}$, and $x_{12}, y_{12}, z_{12}$, are real valued parameters greater than or equal to zero.

In Step 9, the new digital video output image, featuring an individually selected color change, obtained from the new set of chromatic components, Cr'(i,j) and Cb'(i,j), is displayed on the TV or video display screen. All remaining colors, other than the individual color selected for change, of the video input image chromatic components Cr(i,j) and Cb(i,j), are left unchanged by this procedure, and appear in the display along with the selected individual color change.

While the invention has been described with respect to one embodiment, it will be appreciated that many variations, modifications and other applications of the invention may be made.

What is claimed is:

1. A method of selectively controlling an individual color of a digital video input image, the steps of the method being performed by a data processor, the method comprising the steps of:
   (a) receiving the digital video input image, featuring pixels;
   (b) characterizing the digital video input image and its target output image;
   (c) selecting an individual color of the digital video input image to be controlled;
   (d) defining a set of individual color look-up-tables according to an individual color;
   (e) defining a set of individual color control functions according to an individual color for calculating values in said set of individual color look-up-tables;
   (f) assigning values to color control parameters in said set of individual color control functions;
   (g) inserting initial values into said set of individual color look-up-tables;
   (h) determining new values in said set of individual color look-up-tables;
   (i) determining values of pixels in said target output image from said new values in said set of individual color look-up-tables; and
   (j) displaying said target output image on a video display device, said target output image includes a change in an individual color of the digital video input image, whereby all other colors of the digital video input image remain unchanged.

2. The method of claim 1, whereby an individual color represents a linear combination of base colors, said base colors comprising red, green, blue, yellow, cyan, and magenta.

3. The method of claim 1, whereby each said individual color look-up-table of said a set of individual color look-up-tables is a function of values of said pixels of chromatic components of the digital video input image, said chromatic components of the digital video input image having a chromatic dynamic range.

4. The method of claim 1, whereby said color control parameters include a plurality of tangents, whereby each of said a plurality of tangents is used to control saturation of all individual color in the digital video input image.

5. The method of claim 4, wherein said each of said a plurality of tangents is assigned a value according to an individual color, wherein said value of said each of said a plurality of tangents is real and greater than or equal to zero.

6. The method of claim 1, whereby said color control parameters include a plurality of integer break points, whereby each of said a plurality of integer break points is the point at which a chromatic curve of an individual color in the digital video input image has a change in slope.

7. The method of claim 6, wherein said each of said a plurality of integer break points is assigned a value according to an individual color, wherein said value of said each of said a plurality of integer break points is within the chromatic dynamic range of chromatic components of the digital video input image.

8. The method of claim 1, wherein each of said set of individual color control functions is a function of said color control parameters, said color control parameters include said tangents and said integer break points.

9. The method of claim 8, wherein said each of said set of individual color control functions is selected from the group consisting of linear function and non-linear function, of said pixels of chromatic components of the digital video input image, a said tangent, and a said integer break point.

10. The method of claim 1, wherein said initial values inserted into each of said set of said individual color look-up-tables feature values of said pixels of chromatic components of the digital video input image.

11. The method of claim 1, whereby when the data processor is turned on, said initial values inserted into each of said a set of said individual color look-up-tables include values last appearing in said each of said a plurality of individual color look-up-tables when the data processor was last turned off.

12. The method of claim 1, wherein the step of determining new values in said set of said individual color look-up-tables comprises the steps of:
   (i) calculating values from each of said set of said individual color control functions, said values selected from the group consisting of valid and invalid said values, wherein each of said valid values is inside a chromatic dynamic range of the digital video input image, and wherein each of said invalid values is outside said a chromatic dynamic range of the digital video input image;

(ii) replacing said invalid values with cutoff values, said cutoff values featuring said valid values inside said a chromatic dynamic range of the digital video input image; and (iii) inserting said valid values into said set of said individual color look-up-tables.

13. The method of claim 1, wherein the step of determining values of pixels in said target output image from said new values in said set of said individual color look-up-tables comprises the step of calculating said values of said pixels in said target output image from a linear combination of said new values in said set of said individual color look-up-tables.

14. the method of claim 1, wherein the digital video input image features a chromatic dynamic range, said chromatic dynamic range is determined between the black level to the white level of said digital video input image, wherein said chromatic dynamic range is selected according to the number of bits of an individual color.

15. The method of claim 1, wherein the size of said digital video input image is equal to the size of said its target output image.

16. The method of claim 1, whereby when the data processor receives a request of selective control of an individual color of a digital video input image, said values of said pixels in said target output image determined from a previous said request of said selective control of an individual color are erased.

17. A method of selectively controlling an individual color of a digital video input image, the steps of the method being performed by a data processor, the method comprising the steps of:

(a) receiving the digital video input image, featuring pixels;

(b) characterizing the digital video input image and its target output image;

(c) selecting an individual color of the digital video input image to be controlled;

(d) defining a set of individual color look-up-tables according to an individual color;

(e) defining a set of individual color control functions according to an individual color for calculating values in said set of individual color look-up-tables;

(f) assigning values to color control parameters in said set of individual color control functions, said color control parameters include a plurality of tangents and a plurality of integer break points, whereby each of said a plurality of tangents is used to control saturation of an individual color in the digital video input image, and whereby each of said a plurality of integer break points is the point at which a chromatic curve of an individual color in the digital video input image has a change in slope;

(g) inserting Initial values into said set of individual color look-up-tables;

(h) determining new values in said set of individual color look-up-tables;

(i) calculating values of said pixels in said target output image from a linear combination of said new values in said set of said individual color look-up-tables; and (j) displaying said target output image on a video display device, said target output image includes a change in an individual color of the digital video input image, whereby all other colors of the digital video input image remain unchanged.

18. The method of claim 17, whereby an individual color represents a linear combination of base colors, said base colors comprising red, green, blue, yellow, cyan, and magenta.

* * * * *